US012708586B2

(12) United States Patent
Schuleri

(10) Patent No.: US 12,708,586 B2
(45) Date of Patent: *Aug. 18, 2026

(54) WALKING FRAME COVER

(71) Applicant: Mary Schuleri, Media, PA (US)

(72) Inventor: Mary Schuleri, Media, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/746,973

(22) Filed: Jun. 18, 2024

(65) Prior Publication Data

US 2026/0000565 A1 Jan. 1, 2026

Related U.S. Application Data

(63) Continuation of application No. 18/176,793, filed on Mar. 1, 2023, now Pat. No. 12,011,412, which is a continuation of application No. 17/455,298, filed on Nov. 17, 2021, now Pat. No. 11,690,777, which is a continuation-in-part of application No. 16/946,260, filed on Jun. 12, 2020, now Pat. No. 11,400,011.

(60) Provisional application No. 62/860,323, filed on Jun. 12, 2019.

(51) Int. Cl.
*A61H 3/00* (2006.01)

(52) U.S. Cl.
CPC ......... *A61H 3/00* (2013.01); *A61H 2003/002* (2013.01); *A61H 2201/0107* (2013.01)

(58) Field of Classification Search
CPC .............. A61H 3/00; A61H 2201/1685; A61H 2201/1688; G08B 21/0461
See application file for complete search history.

(56) References Cited

U.S. PATENT DOCUMENTS

| | | | | |
|---|---|---|---|---|
| 4,027,687 A * | 6/1977 | McGowan | A61H 3/00 | D3/10 |
| 5,340,005 A * | 8/1994 | Woods | A61H 3/02 | 224/407 |
| 5,511,710 A * | 4/1996 | Woods | A61H 3/00 | 224/407 |
| 5,513,789 A * | 5/1996 | Woods | A61H 3/02 | 224/407 |
| 7,984,724 B1 * | 7/2011 | Eberle | A61H 3/04 | 224/407 |
| 8,316,870 B2 * | 11/2012 | Morris | G09F 21/02 | 135/66 |
| 2007/0277864 A1 * | 12/2007 | Sussman | A45B 9/00 | 224/407 |
| 2007/0278271 A1 * | 12/2007 | Koren | A45C 3/00 | 224/407 |

* cited by examiner

*Primary Examiner* — Noah Chandler Hawk
(74) *Attorney, Agent, or Firm* — K&L Gates LLP

(57) ABSTRACT

A cover for a walking frame is disclosed herein. The cover includes a central crossmember portion, a left arm portion, and a right arm portion. The left and right arm portions include a receptacle defined by an inner flap and an outer flap on each of said left and right arm portions. The central crossmember portion includes at least one fastener pair for securing said central crossmember portion.

19 Claims, 9 Drawing Sheets

WALKING FRAME COVER

CROSS-REFERENCE TO RELATED APPLICATIONS

This application is a continuation of U.S. patent application Ser. No. 18/176,793 filed on Mar. 1, 2023 and now issued as U.S. Pat. No. 12,011,412, which is a continuation of U.S. patent application Ser. No. 17/455,298 and now issued as U.S. Pat. No. 11,690,777, which is a continuation-in-part of U.S. patent application Ser. No. 16/946,260 filed on Jun. 12, 2020, which claims the benefit of U.S. Provisional Patent Application No. 62/860,323 filed on Jun. 12, 2019, with the United States Patent and Trademark Office, the contents of which are incorporated herein by reference in their entirety.

FIELD OF THE INVENTION

The present invention is related to devices which assist with mobility and particularly to devices that provide an aesthetic or ornamental decoration of those devices while aiding in distinguishing devices from one another and providing additional carrying capacity for users.

BACKGROUND OF THE INVENTION

Disabled individuals of all ages and people who need additional support to maintain balance or stability, while walking typically require some form of waking aid. For example, the aging process brings with it a natural reduction of mobility, making it difficult for older individuals to move about on their own. Additionally, individuals who are wounded or injured, veterans who are wounded in war, and children born with disabilities experience similar mobility issues. This reduction of mobility can be frustrating for people accustomed to being independent, as they become more reliant on others to move about. As a solution, people and companies have endeavored throughout history to create devices capable of enabling disabled individuals to regain some of that lost mobility, with some common examples being canes and walking frames, on which disabled individuals can lean to hold themselves upright and increase their ability to walk on their own.

However, while very reliable in their utility, walking frames on their own do not offer many aesthetic qualities, being mostly metal tubing bent into a predetermined shape, which are commonly prescribed by physicians and purchased in pharmacies. Although variations of walking frame designs exist, most walking frames of a common design have identical functionality despite variations in color and positioning of otherwise identical components. Therefore, walking frames are often not used by individuals who could benefit from their use due to the psychological impact of feeling old or attracting negative attention. Largely, walking frames are unremarkable in creative expression and difficult to distinguish in large groups, such as a number of walking frames placed alongside a wall together when not in use. The majority of walking frames also typically do not provide storage space for personal items being carried by the individuals using them.

SUMMARY OF THE INVENTION

The embodiments described herein are directed toward a cover constructed of cloth material or other types of pliable materials and various fasteners which can be placed over and wrapped around a walking frame to give it a unique visual appearance, such as color or pattern designs. In particular, the addition of such material aids in distinguishing the device from others and reduces negative psychological impacts due to implications of use of a walking frame.

In preferred embodiments, the walking frame is one of any number of now known or developed frames, typically comprising at least two legs, a supporting bar or crossmember connecting the at least two legs, and two handles, wherein the cover attaches to each of the legs and the supporting bar or crossmember, while providing access to the handles. Those of ordinary skill in the art will recognize that the covers described herein can be modified slightly to connect to such variations without deviation from the invention.

In the preferred embodiment the walking frame cover is comprised of two sections which are mirror images of each other. The primary feature of each section is a wing having a general shape of the Latin letter H, having two legs at the bottom of the wing which wrap around the legs of the walking frame. Two arms at the top of the wing are defined by a first and second layer of material to define a receptacle having an open bottom for placing over a portion of the walking frame. The two arms further provide an aperture for easy access to grip the handles of the walking frame. A centrally-located butterfly-shaped section comprised of two mirror-image sections which may be joined at a central seam joins the two wings together and is further wrapped around the cross frame of the walking frame to further secure the walking frame cover into place.

The use of a walking frame cover can allow walking frames to be easily differentiated from one another when each uses a different walking frame cover. In some embodiments the walking frame cover can be reversible to give the user a choice of appearance, with opposing sides of the material having different aesthetic patterns.

The walking frame cover attaches easily and stably to the walking frame. The walking frame cover is attached to the walking frame by a plurality of fasteners which secure it firmly. The fasteners are of a type which can be fixed and unfixed easily to allow the walking frame cover to be easily removed from the walking frame.

In preferred embodiments the walking frame cover also comprises pockets which can be used to store personal items belonging to the user. The pockets may be a permanent component of the walking frame cover or may be separate to be attached and detached as the user desires.

In preferred embodiments the walking frame cover is constructed of material which is a natural or synthetic material. The material may be washable to allow for easy sterilization of the walking frame cover. The material may include an antimicrobial agent applied as a coating or embedded into the material. The walking frame cover may be constructed of a single piece of material or may be made of multiple pieces joined together.

In a preferred embodiment, the claimed invention is a system comprising a cover oriented around a three-dimensional object, said three-dimensional object comprising a cross frame, two side frames each comprising a front and rear leg, a handle, and at least one crossmember, said cover comprising two sections which mirror each other, said sections joined at a central seam, each section comprising: a side frame cover in the shape of the Latin letter H having a top and a bottom, said Latin letter H having two arms and two legs, a first side and a second side, and an outside surface and an inside surface, and a receptacle defined between a first sheet and a second sheet encompassing the arms and an aperture in said receptacle, said aperture defined to receive through said aperture said handle of said three-dimensional object; and a cross frame cover comprised of a section of material attached to one side of said side frame cover which joins to its counterpart on the opposite section at the central seam; and at least one pair of fasteners to secure said planar cover around or to said three-dimensional object.

In a preferred embodiment, a cover for a three-dimensional walking frame, said cover comprising a left side section and a right side section which mirror each other along a central seam, each section comprising a cross frame cover connected to the central seam on a first end and a side frame cover attached to a second end of said cross frame cover; said cross frame cover comprised of an upper and lower cross frame flap, each of the upper and lower cross frame flap comprising at least one half of a pair of fasteners for securing said upper and lower cross frame flaps together; said side frame cover defined in the shape of a Latin letter H having an outer flap and an inner flap, a top and a bottom, two arms and two legs, and a receptacle defined between said outer flap and said inner flap, wherein the outer and inner flaps are secured together to define an aperture at the top of said receptacle and an opening at the bottom, and at least one pair of fasteners defined on each of the two legs, each of the at least one pair of fastener having a first fastener element on one portion of the leg and a second fastener element on a second portion of the leg.

In a preferred embodiment, a cover for a three-dimensional walking frame, said cover comprising: a left side section and a right side section which mirror each other along a central seam, each section comprising a cross frame cover connected to the central seam on a first end and a side frame cover attached to a second end of said cross frame cover; said cross frame cover comprising an upper cross frame flap and a lower cross frame flap, a first unique fastener pair disposed on said upper and lower cross frame flaps, said first unique fastener pair comprised of a first half on the upper cross frame flap and a second half on the lower cross frame flap, for securing said upper and lower cross frame flaps together; said side frame cover having an outer flap and an inner flap, a top and a bottom, two arms and two legs, and a receptacle defined between said outer flap and said inner flap, wherein the outer and inner flaps are secured together to define an aperture at the top of said receptacle and an opening at the bottom; and a second unique fastener pair on each leg, each second unique fastener pair being uniquely coded from another first or second unique fastener pair; each of the second unique fastener pair having a first fastener element on one portion of the leg and a second fastener element on a second portion of the same leg.

In a further preferred embodiment, the cover wherein said outer flap and said inner flap are secured at the top and at a left side and a right side of each of the outer flap and inner flap, with the aperture defined at the top, and each of said outer flap and inner flap each having an outside surface and an inside surface.

In a further preferred embodiment, the cover further comprising at least one side frame flap on each of the side frame covers, each of said side frame flaps secured to a bottom portion of the outer flap and comprising at least a third unique fastener pair wherein a first half of the at least third unique fastener pair is disposed on the side frame flap and a second other half of the at least third unique fastener pair is disposed on the inside surface of the inner flap and having a different unique coding from the first or second unique fastener pair.

In a further preferred embodiment, the cover further comprising a cross frame upper flap on each of said cross frame covers and a cross frame lower flap on each of said cross frame covers, said cross frame upper flap having a fastener which connects to a counterpart fastener on said cross frame lower flap.

In a further preferred embodiment, the cover wherein each of the side frame covers further comprises: a front leg cover and a rear leg cover; said rear leg cover further comprising a rear leg outer flap and a rear leg inner flap; said front leg cover having an outside surface and an inside surface and having a first side and a second side; said rear leg cover having an outside surface and an inside surface; said front leg cover having unique paired fasteners on the first side of said outside surface and on the second side of said inside surface; and said rear leg cover having unique paired fasteners on said outside surface of said rear leg outer flap and on said inside surface of said rear leg inner flap.

In a further preferred embodiment, the cover further comprising at least one pocket on the outside surface of said side frame cover. In a further preferred embodiment, the cover further comprising at least one pocket on the outside surface of said inner flap of said side frame cover. In a further preferred embodiment, the cover wherein said at least one pocket on the outside surface of said side frame cover is selectively attachable and detachable. In a further preferred embodiment, the cover wherein said at least one pocket on the outside surface of said inner flap of said side frame cover is selectively attachable and detachable.

In a further preferred embodiment, the cover wherein the unique fastener pair is selected from the group consisting of: hook-and-loop material, magnets, buttons and holes, male and female snaps, and combinations thereof.

In a further preferred embodiment, the cover wherein the unique fastener pair comprises a unique feature selected from the group consisting of: a color, a pattern, a different material, selectively secured pairs, and combinations thereof.

In a further preferred embodiment, the cover wherein the unique fastener pair defines a left, right, front, and/or back orientation of the cover.

In a further embodiment, a method for attaching a cover to a three-dimensional walking frame; said cover comprising a left section and a right section and an outside surface and an inside surface; said left and right sections each comprising a side frame cover, a cross frame cover, a side frame cover inner flap, a side frame flap, a cross frame upper flap, a cross frame lower flap, a front leg cover, a rear leg cover having a rear leg outer flap and a rear leg inner flap, a side frame handle cutout, and an inflection point; and a plurality of fasteners, said plurality of fasteners provided in at least one unique fastener pair wherein each unique fastener pair is coded using a unique coding different than another unique fastener pair; folding said cover at said inflection points and placing said cover over the three-dimensional walking frame with said three-dimensional walking frame contained within said side frame covers and side frame cover inner flaps; folding said side frame flaps up to attach the unique fastener pairs on said side frame flaps and said inside surfaces of said side frame cover inner flaps; folding said cross frame upper flaps down and folding said cross frame lower flaps up to meet and securing said cross frame upper flaps and said cross frame lower flaps using said unique fastener pairs; wrapping said front leg covers around said three-dimensional walking frame and securing using said unique fastener pairs; and wrapping said rear leg covers around said three-dimensional walking frame, joining said rear leg outer flaps and said rear leg inner flaps with said unique fastener pairs.

In a further preferred embodiment, the method wherein the at least one unique fastener pair is selected from the group consisting of: hook-and-loop material, magnets, buttons and holes, male and female snaps, and combinations thereof.

In a further preferred embodiment, the method wherein the unique coding is selected from the group consisting of: a color, a pattern, a different material, selectively secured pairs, and combinations thereof.

In a further preferred embodiment, the method wherein the unique coding provides an orientation for a left, right, front, and/or back position of the cover.

In a further embodiment, a cover for a walking frame comprising: a central crossmember portion, a left arm portion, and a right arm portion; said left and right arm portions comprising a receptacle defined by an inner flap and an outer flap on each of said left and right arm portions; and wherein said central crossmember portion comprises at least one fastener pair for securing said central crossmember portion.

DETAILED DESCRIPTION OF THE INVENTION

Figure 1:
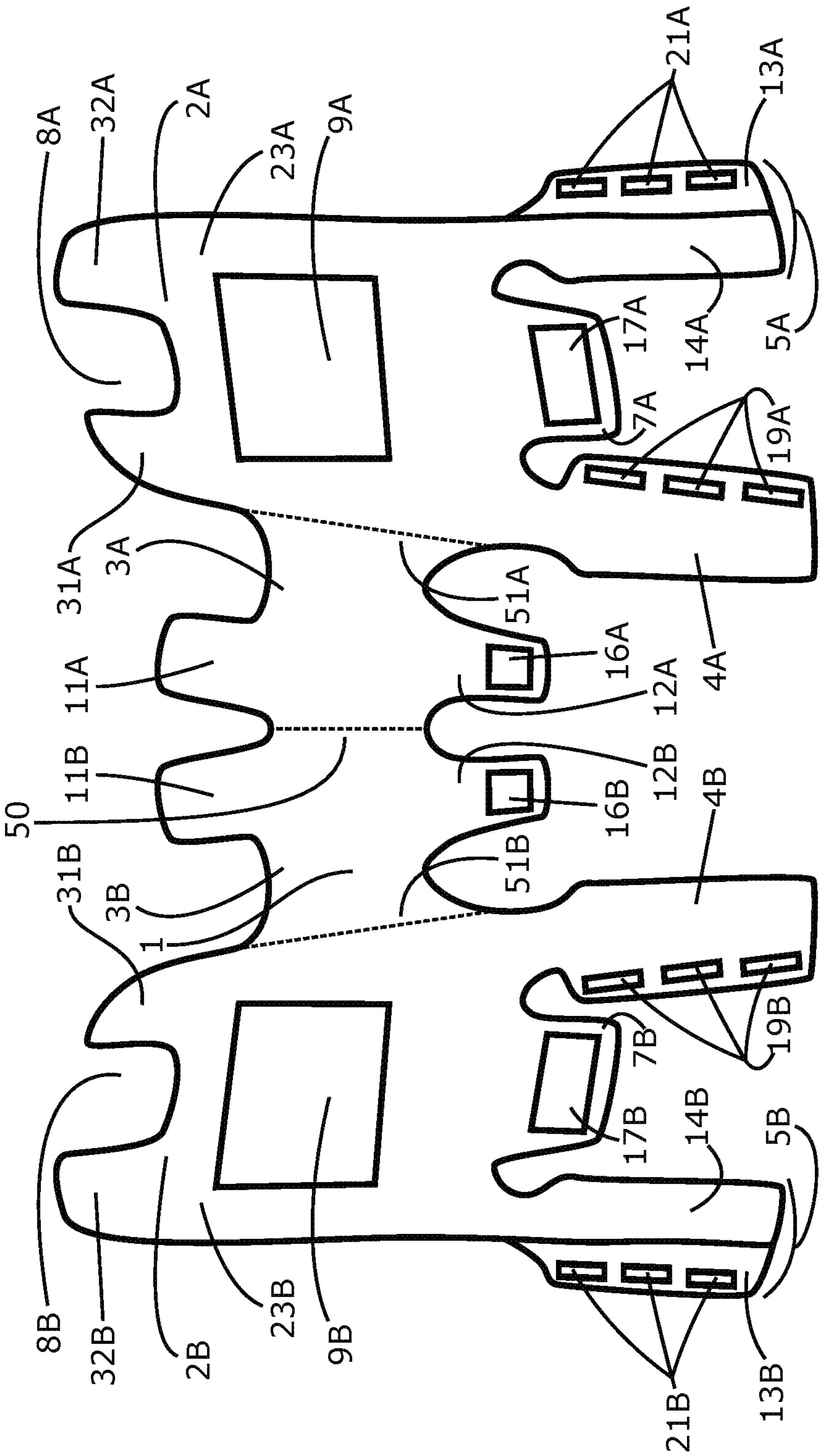
FIG. 1 shows the outer face of the walking frame cover laid flat.

The present invention is directed toward a cover for a three-dimensional object such as a walking frame, hereafter referred to as a walking frame cover, which is designed to be wrapped around and secured to the walking frame. The use of a walking frame cover provides the user with a variety of options to personalize and accessorize a walking frame. The walking frame cover can also allow it to be more easily differentiated among a large group of otherwise visually similar walking frames.

In preferred embodiments the walking frame cover is constructed of material which is a natural or synthetic material. The material may be washable to allow for easy sterilization of the walking frame cover. The material may include an antimicrobial agent applied as a coating or embedded into the material, for example, antibacterial compounds; silver, copper, and other metallic fibers; essential oils; and other antibacterial agents known to those of ordinary skill in the art.

In the preferred embodiment the walking frame cover (I) is constructed of multiple sheets of fabric material joined together, for example, at a central seam (50), and other seams, as necessary. This allows the cover to be general planar and then folded around a three-dimensional object (the walking frame). In further embodiments the walking frame cover (1) may also be constructed of a single piece of material.

The preferred embodiment of the walking frame cover is comprised of a left section and a right section which are mirror images of each other and which in the figures are generally depicted by (A) and (B) sides in the drawings. The primary feature of each section is a side frame cover which takes the form of a wing in the general shape of the Latin letter H. A preferred embodiment of the wing in the shape of the Latin letter H has two leg covers at the bottom of the side frame cover which wrap around the legs of the walking frame to secure the cover around the frame, the rear leg cover being comprised of outer and inner flaps. Two arms at the top of the side frame cover are the top of a receptacle or pocket element and provide an aperture between the arms for easy access to grip the handles of the walking frame while securing the arms over and around the top of the frame.

An additional section of material is attached to one side of the side frame cover which, when joined at a central seam to its counterpart on the mirror image, create a cross frame cover traversing the two side frame covers. In preferred embodiments, the cross frame cover further comprises upper and lower flaps which wrap around the cross frame of the walking frame to further secure the cover around the cross frame.

The elements described herein are mirrored on both sides of the walking frame cover (1), which is divided into (A) and (B) sections. As described herein, the (B) section is a mirror image of the (A) section, and thus the features, processes, and instructions are understood by those of ordinary skill in the art as being described by the appropriate (A) section to the extent that a (B) section is not explicitly stated herein but is described in the Figures.

Figure 3:
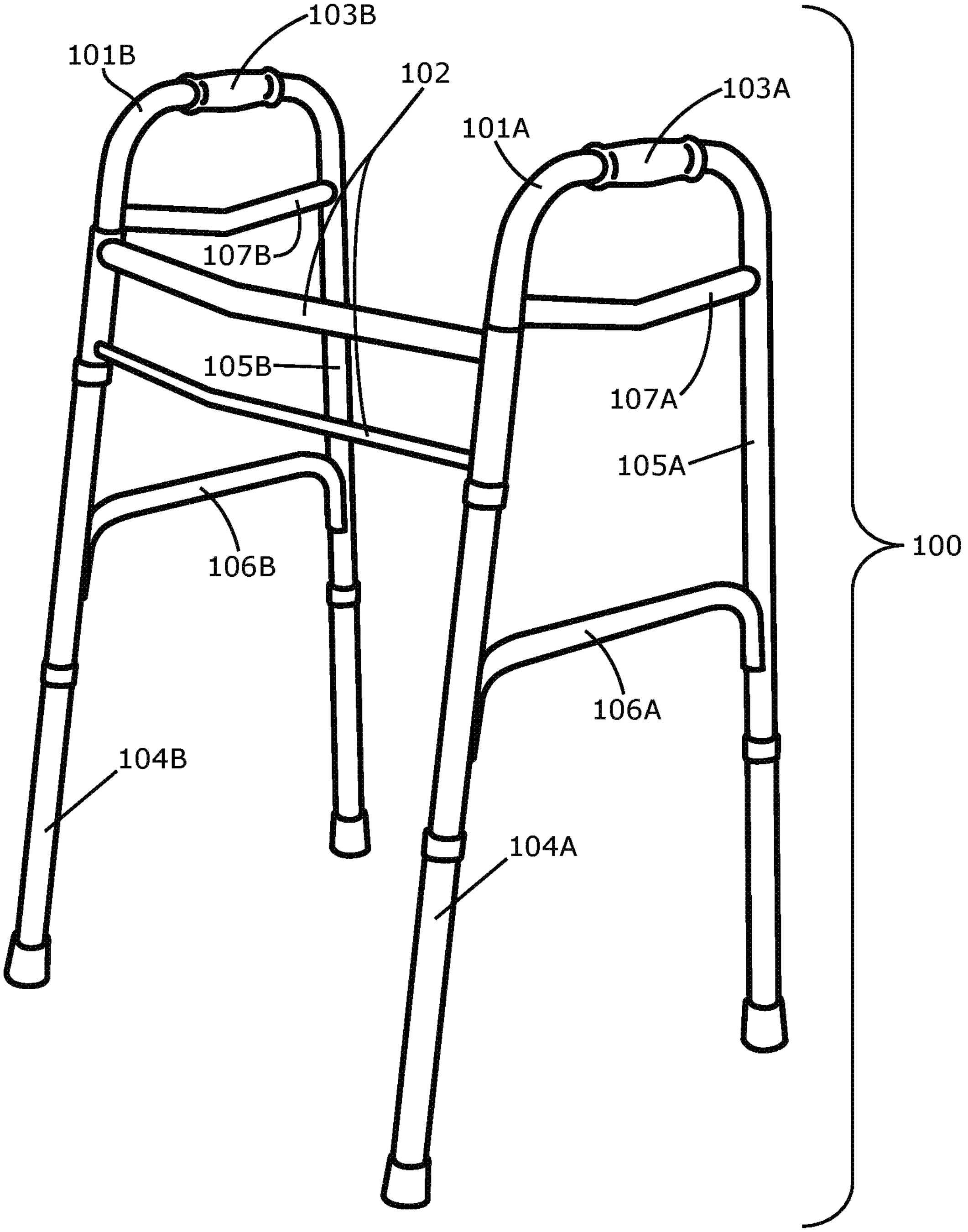
FIG. 3 shows an example walking frame.

FIG. 1 depicts a planar view of the outer surface of the walking frame cover (I) as it appears before placing on the walking frame (100) depicted in FIG. 3. While there are several variations of walking frames, a particular walking frame (100), is depicted in FIG. 3, and comprises a cross frame (102) which connects left (101A) and right (101B) side frames. Each side frame (101A and 101B) comprises a side frame handle (103A or 103B) at the top, a side frame upper crossmember (107A or 107B), a side frame lower crossmember (106A or 106B), a front leg (104A or 104B), and a rear leg (105A or 105B). Those of ordinary skill in the art will recognize that other walking frames exist, with similar but not identical features, and that the walking frame cover may be modified slightly to fit such variations with the general provision of having some leg feature attached to some handle element for grasping by the user.

Figure 2:
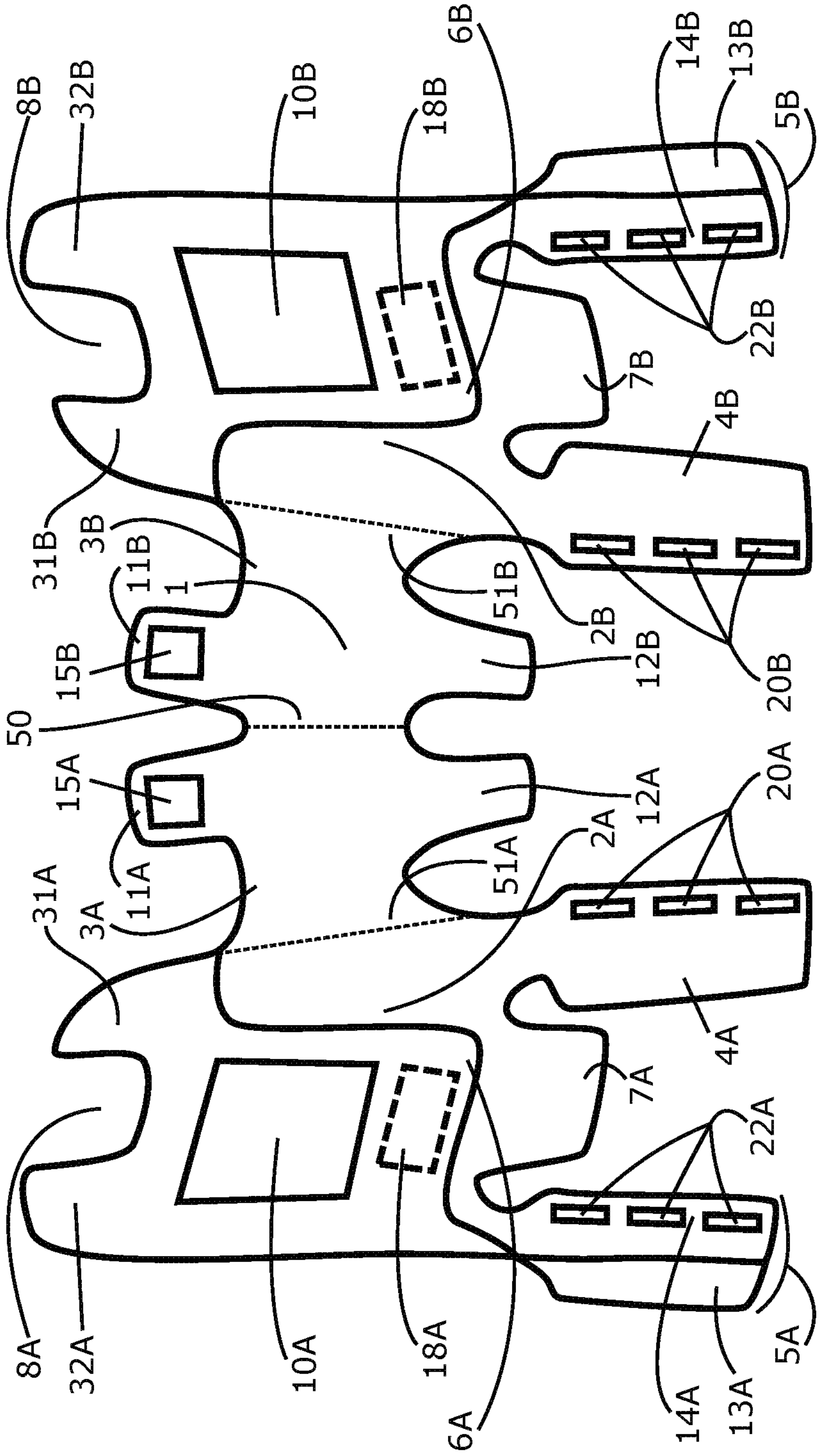
FIG. 2 shows the inner face of the walking frame cover laid flat.

FIGS. 1 and 2 detail the planar view of the walking frame cover (1), with FIG. 1 specifically depicting the outer surface and FIG. 2 depicting the inner surface of the walking frame cover (1) as it appears in the present embodiment. FIG. 1 details several features including: the central seam (50) between the two cross frame covers, a left cross frame cover (3B), and a right cross frame cover (3A). The left cross frame cover (3B) and right cross frame cover (3A) each comprise a cross frame upper flap (11A or 11B), a cross frame lower flap (12A or 12B), and a fastener (16A or 16B). An inflection point (51A or 51B) shows the point at which the material is folded to attach the side frame cover (2A or 2B) to the walking frame (100). The side frame cover (2A) contains an outer flap (23A), a right arm (32A), and a left arm (31A), defining between them a side frame handle cutout (8A). Further defined are an outer pocket (9A), a fastener (17A) on the side frame flap (7A), a fastener group (19A) on the front leg cover (4A), a rear leg inner flap (14A), and a fastener group (21A) on the rear leg outer flap (13A) on the rear leg cover (5A). The left side is a mirror image, with a left side frame cover (2B) containing outer flap (23B), right arm (32B), and left arm (31B), defining between them side frame handle cutout (8B). Further defined are outer pocket (9B), fastener (17B) on the side frame flap (7B), fastener group (19B) on the front leg cover (4B), rear leg inner flap (14B), and fastener group (21B) on the rear leg outer flap (13B) on the rear leg cover (5B).

FIG. 2 details a side frame cover inner flap (6A), which drapes over the side frame (101A) of the walking frame (100). Side frame flap (7A) is used to further secure side frame cover (2A) to side frame cover inner flap (6A). Side frame cover (2A) also features a side frame handle cutout (8A), through which the user may access side frame handle (103A).

To fold and fasten the walking frame cover (I), one side of the cover is folded at inflection point (51A) and placed over the walking frame (100) with the side frame (101A) within a receptacle (33A in FIG. 4) that is defined by the outer flap (23A) at the front of the receptacle and side frame cover inner flap (6A) on the inside of the receptacle, the left arm (3IA) and right arm (32A) of the side frame cover inner flap (6A) resting atop of the side frame (101A) and therefore holding the walking frame cover (1) to the walking frame (100) by means of gravity. Accordingly, there are two layers of material: the outer flap (23A) and the inner flap (6A), with an open bottom and the top being defined by the arms (3IA, 32A), and an aperture (side frame handle cutout [8A]), wherein the receptacle is placed over the side frame (101A) through the open bottom, and the side frame handle cutout (8A) provides an opening for the handle wherein the arms are resting atop the side frame (101A).

Figure 4:
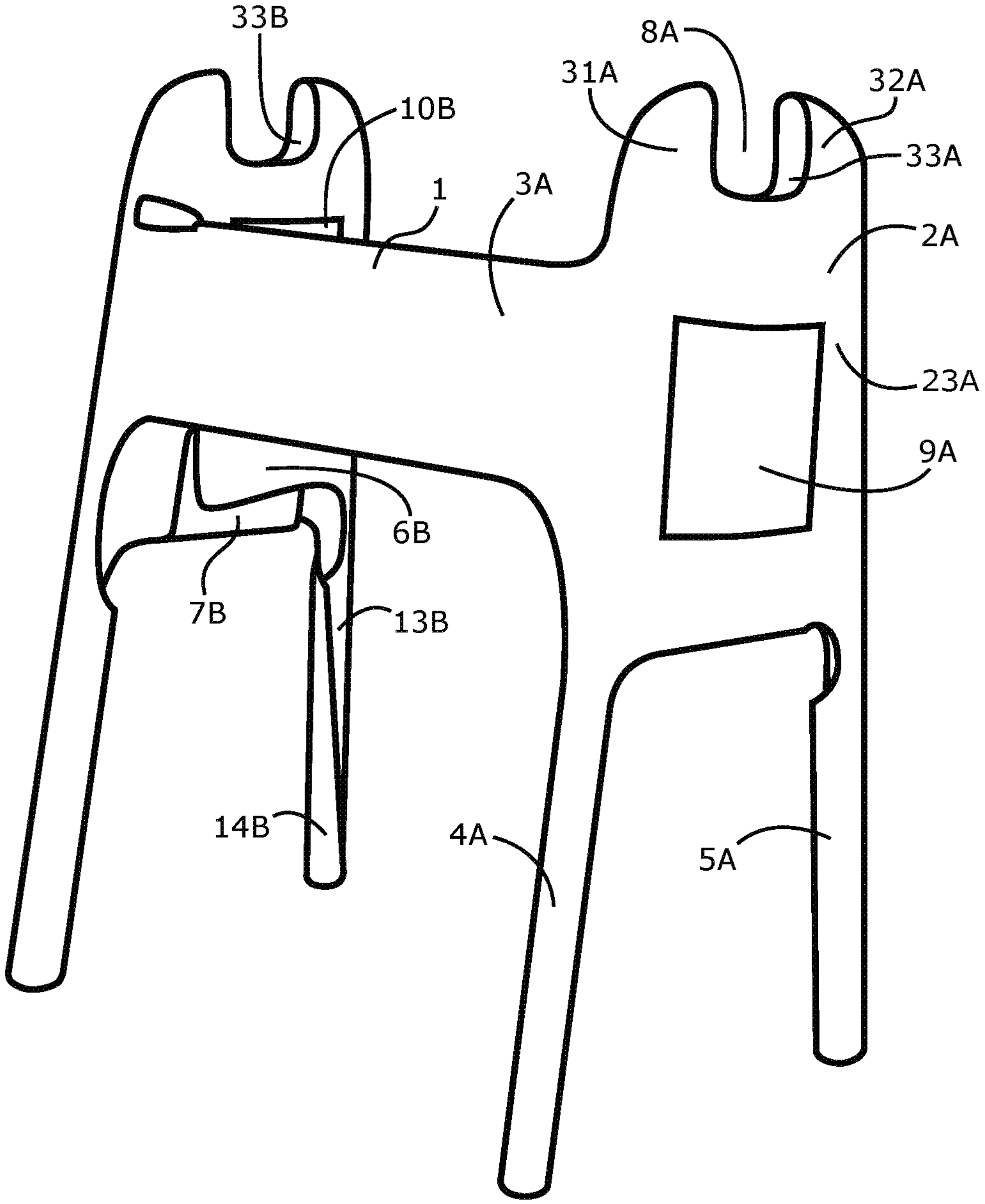
FIG. 4 shows the walking frame cover folded into its assembled shape.
Figure 5:
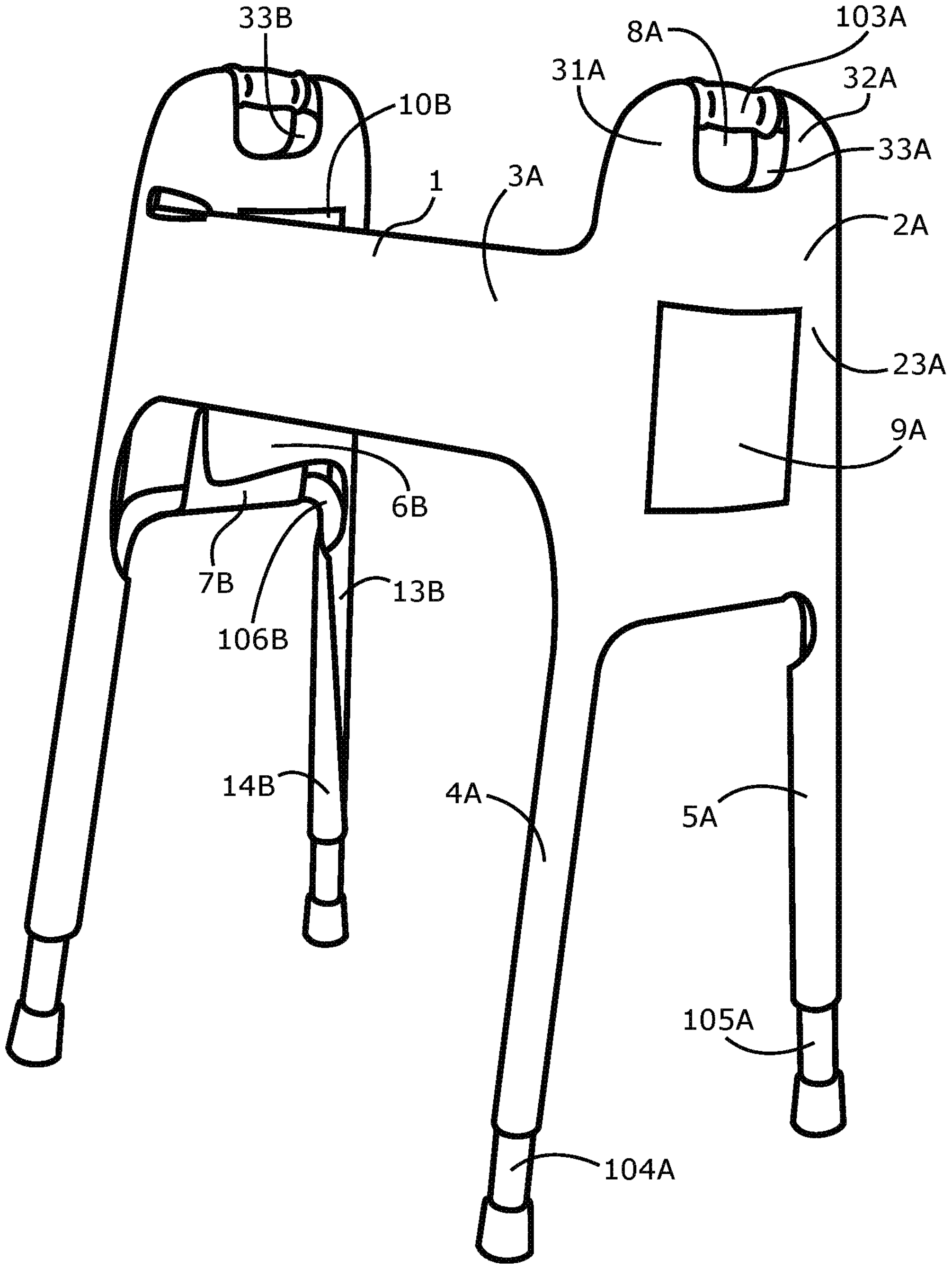
FIG. 5 shows the walking frame with the assembled walking frame cover assembled around it.

Thus, the side frame handle (103A) is accessible through the aperture, which is a side frame handle cutout (8A), which is between the left arm (3IA) and the right arm (32A). Each of the left arm (3IA) and right arm (32A) have a front and back side and define a receptacle (33A) between the front and back side. Accordingly, as depicted in FIGS. 4 and 5, a receptacle (33A) is defined between the inner and outer sheets, and the inner portion of the receptacle rests on a portion of the side frame (101A) while the side frame handle (103A) is accessible because of the aperture of the side frame handle cutout (8A).

Continuing the process of securing the walking frame cover (1), side frame flap (7A) is folded up around side frame lower crossmember (106A) and fastener (17A) on side frame flap (7A) is attached to fastener (18A) on the inner surface of side frame cover inner flap (6A). Cross frame cover (3A) is secured to cross frame (102) by folding cross frame upper flap (IIA) down, cross frame lower flap (12A) up, and securing fastener (15A) to fastener (16A).

Front leg cover (4A) is wrapped around front leg (104A) and fastener group (19A) is secured to fastener group (20A). Rear leg cover (5A) is attached to rear leg (105A) by wrapping rear leg outer flap (13A) and rear leg inner flap (14A) around rear leg (105A) and securing fastener group (21A) to fastener group (22A), resulting in one side of the walking frame cover (1) being completed. The process is repeated for the opposing side with the same steps.

The second side of the cover is folded at inflection point (51B) and placed over the walking frame (100) with the side frame (101B) within the receptacle (33B in FIG. 4) that is defined by the outer flap (23B) of the side frame cover (2B) at the front of the receptacle and side frame cover inner flap (6B) at the rear of the receptacle, the left arm (3IB) and right arm (32B) of the side frame cover inner flap (6B) resting atop of the side frame (101B) and therefore holding the walking frame cover (1) to the walking frame (100) by means of gravity and providing access to the handle (103B) in side frame handle cutout (8B) (aperture). The side frame flap (7B) is folded up around side frame lower crossmember (106B) and fastener (17B) on side frame flap (7B) is attached to fastener (18B) on the inner surface of side frame cover inner flap (6B). Cross frame cover (3B) is secured to cross frame (102) by folding cross frame upper flap (1IB) down, cross frame lower flap (12B) up, and securing fastener (15B) to fastener (16B).

Front leg cover (4B) is wrapped around front leg (104B) and fastener group (19B) is secured to fastener group (20B). Rear leg cover (5B) is attached to rear leg (105B) by wrapping rear leg outer flap (13B) and rear leg inner flap (14B) around rear leg (105B) and securing fastener group (21B) to fastener group (22B), resulting in the second side of the walking frame cover being completed and defining the finished assembled walking frame cover (I) as depicted in FIGS. 4 and 5.

The various elements of the walking frame cover (1) are secured together with fastener pairs. A fastener pair requires each part of the pair to secure to one another. Thus, one half of the pair is, for example, (19B), which may be a first fastener element or group of fasteners, and the other half is (20B), which may be a second fastener element or group of fasteners for the pair. This fastener group may be as few as one pair of fasteners or may be several pairs of fasteners as understood by those of ordinary skill in the art. In preferred embodiments, the fasteners may be selected from a group of various types of fasteners, including magnets, hook and loop fasteners, selective adhesives, male female connectors such as buttons and holes or male and female snaps, zippers, or combinations thereof, and others as known to those of ordinary skill in the art. Additional types of fasteners may be used in further embodiments. In certain embodiments, the number and positioning of fasteners may differ from the present embodiments.

In preferred embodiments, each fastener pair is individually marked so as to clarify and identify the particular opposing member to be secured. For many individuals, it is not always obvious which fastener should secure to another. This is especially problematic where multiple fasteners are provided having the same type, i.e., all magnets or all hook-and-loop material. Even where the pairs are male and female, it is unclear which male goes with which female. An elegant solution is provided where each pair is coded differently than another pair. An example would be that one pair is colored red, another blue, another green, etc. Thus, when orienting the device around a walking frame, the red is attached to the red, the yellow to the yellow, the blue to the blue, etc. This can dramatically reduce frustration when seeking to install a new device, especially where multiple fastener pairs are afforded, such as in this case. It is also possible to use other coding methods, for example, different size fasteners, different patterns printed on each pair, or other visual cues that identify which pair belongs together. In another embodiment, each pair may also use a different mechanism, for example, one is magnetic, one is hook-and-loop, another is comprised of snaps, etc. This would ensure that only one type of fastener is used in one section. Another mechanism may be to utilize specific fastener pairs wherein each pair only selectively secures to its match. This can be accomplished by sizing the snaps, choosing different types of hook-and-loop material, having male and female pairs with unique features to allow only one style of male to fit a specific female, etc.

A key further benefit of having a visible coding for each of the pairs is that it can increase the success rate of installation by providing clear instructions for installation. For example, it may allow the proper orientation of the walking frame cover over a walking frame simply by explaining, for example, that the left front snap pair is red and the right front snap pair is yellow. This allows for orientation of a left and right and a front versus a rear orientation. Accordingly, this provides for a visual opportunity to ensure proper fit and orientation of the device onto a walking frame.

FIG. 4 depicts the walking frame cover (1) in its folded state without the underlying walking frame, while FIG. 5 depicts the walking frame cover (1) as attached to a walking frame. The precise order of each element being attached is not material, and thus any order can be utilized for securing the walking frame cover (1) to a walking frame.

In further embodiments, the outer and inner surfaces may be identical in construction but differ in visual appearance so as to provide the ability to reverse the walking frame cover (1) to change the design pattern. Indeed, in certain applications the walking frame cover is a single sheet of material having a different design on each side of the material. Alternatively, two or more different materials are combined, forming a first design on one side and a second design on the obverse side with the two or more layers secured together.

In the present embodiments, the walking frame cover (I) is designed to be removable to allow for the user to place it on another walking frame if, for example, the original walking frame needs to be replaced, or for any other reason. The user may also have multiple walking frame covers to provide a choice of patterns and design styles for different days or moods. Accordingly, the ability to easily reverse the walking frame cover with different patterns on the outer and inner surfaces to allow a single walking frame cover to provide a choice between two patterns.

To remove the walking frame cover (1) from the walking frame (100), fastener group (19A) is detached from fastener group (20A) and fastener group (21A) is detached from fastener group (22A) to remove front leg cover (4A) from front leg (104A) and rear leg cover (5A), rear leg outer flap (13A), and rear leg inner flap (14A) from rear leg (105A) respectively. Fastener (17A) is detached from fastener (18A) to disconnect side frame flap (7A) from side frame cover inner flap (6A) and so unfix side frame cover inner flap (6A) from side frame lower cross member (106A). Fastener (15A) is detached from fastener (16A) to unfix cross frame upper flap (11A) from cross frame lower flap (12A) and therefore unsecure cross frame cover (3A) from cross frame (102). The same process is repeated on the opposing side of the walking frame cover, as would be understood by those of ordinary skill in the art, by detaching the corresponding elements on the (B) side.

With all fasteners detached, the walking frame cover (1) can then be lifted off the walking frame (100). As with attachment, the precise order of detachment of the various elements is not essential to the function, and thus any order can be utilized to unsecure the walking frame cover (1) from a walking frame.

In the preferred embodiment the walking frame cover (1) is equipped with permanently attached pockets depicted as outer pockets (9A and 9B) and inner pockets (IOA and IOB), which provide storage space for the user's personal belongings. Further embodiments allow for the outer pocket (9A or 9B) and inner pocket (IOA or IOB) to be detachable from the walking frame cover (1) as illustrated in FIGS. 6A, 6B, 7A, and 7B. In preferred embodiments, one of the inner or outer pockets further comprises within said pocket a battery. The battery is provided to allow for an external power source to any component that may be added to the walking frame cover or placed in a pocket of the walking frame cover. Nonlimiting examples may include a charger for an electronic device, a speaker, to power a light or lights, to power an electronic component, etc.

Figure 6A:
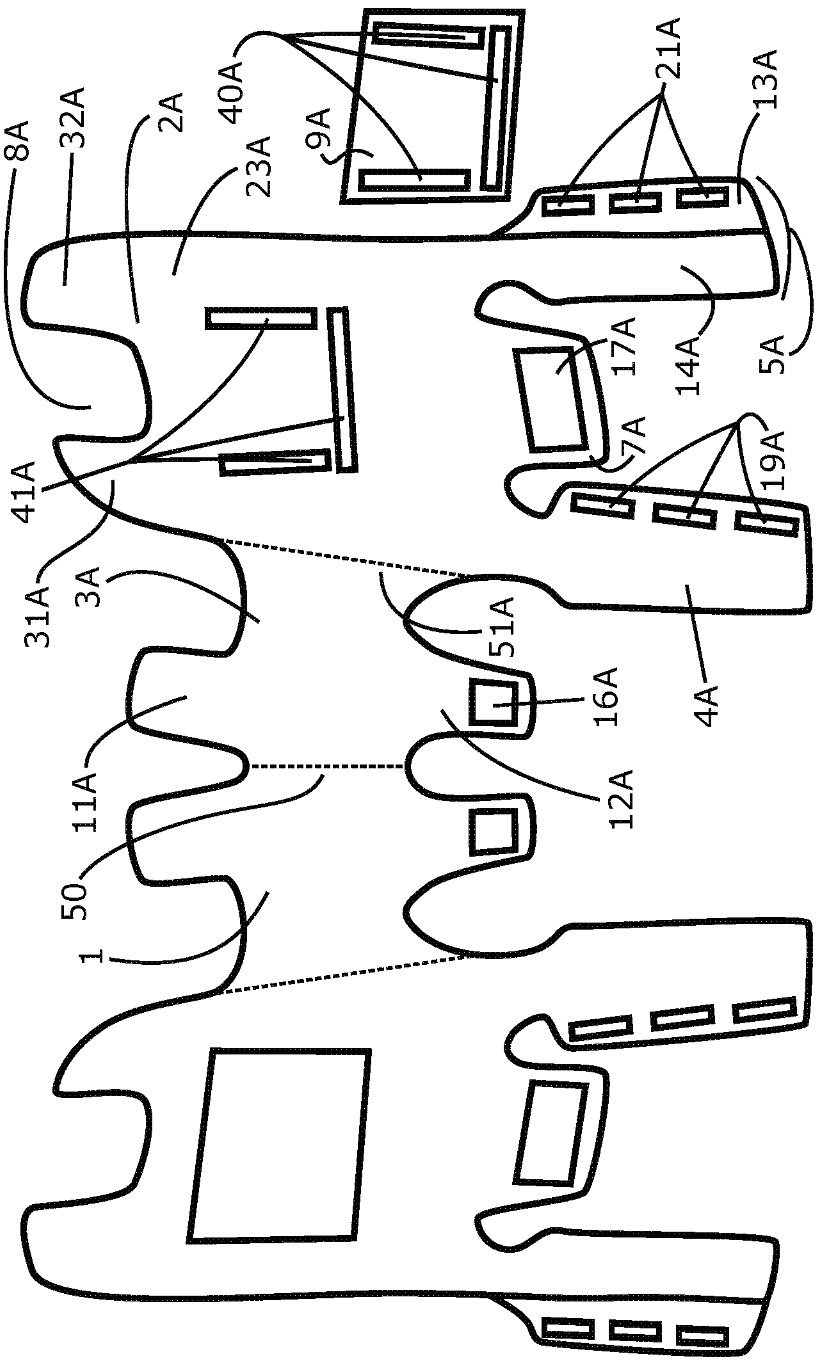
FIGS. 6A and 6B illustrate an embodiment of the walking frame cover with detachable pockets, with each depicting one outer pocket detached from the side frame cover to reveal the fasteners used to secure it.
Figure 6B:
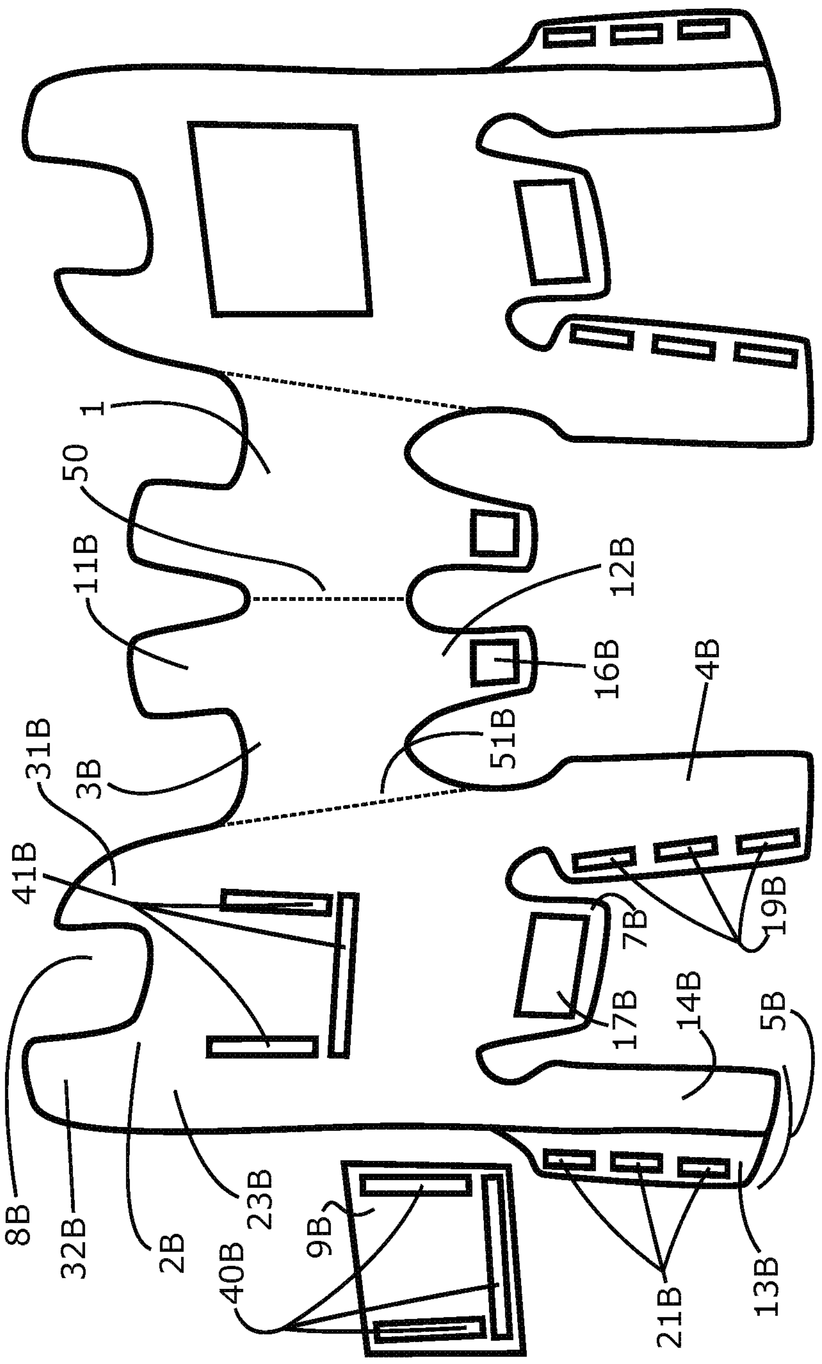

In FIG. 6A, the outer pocket (9A) is attached to the side frame cover (2A) by securing fastener group (40A) to fastener group (41A). Outer pocket (9A) can subsequently be detached from side frame cover (2A) by unfixing fastener group (40A) from fastener group (41A). FIG. 6B details the opposing side outer pocket (9B), which is secured by securing fastener group (40B) to fastener group (41B). Outer pocket (9B) can be excluded, used alone, or used together with the right side outer pocket (9A).

Figure 7A:
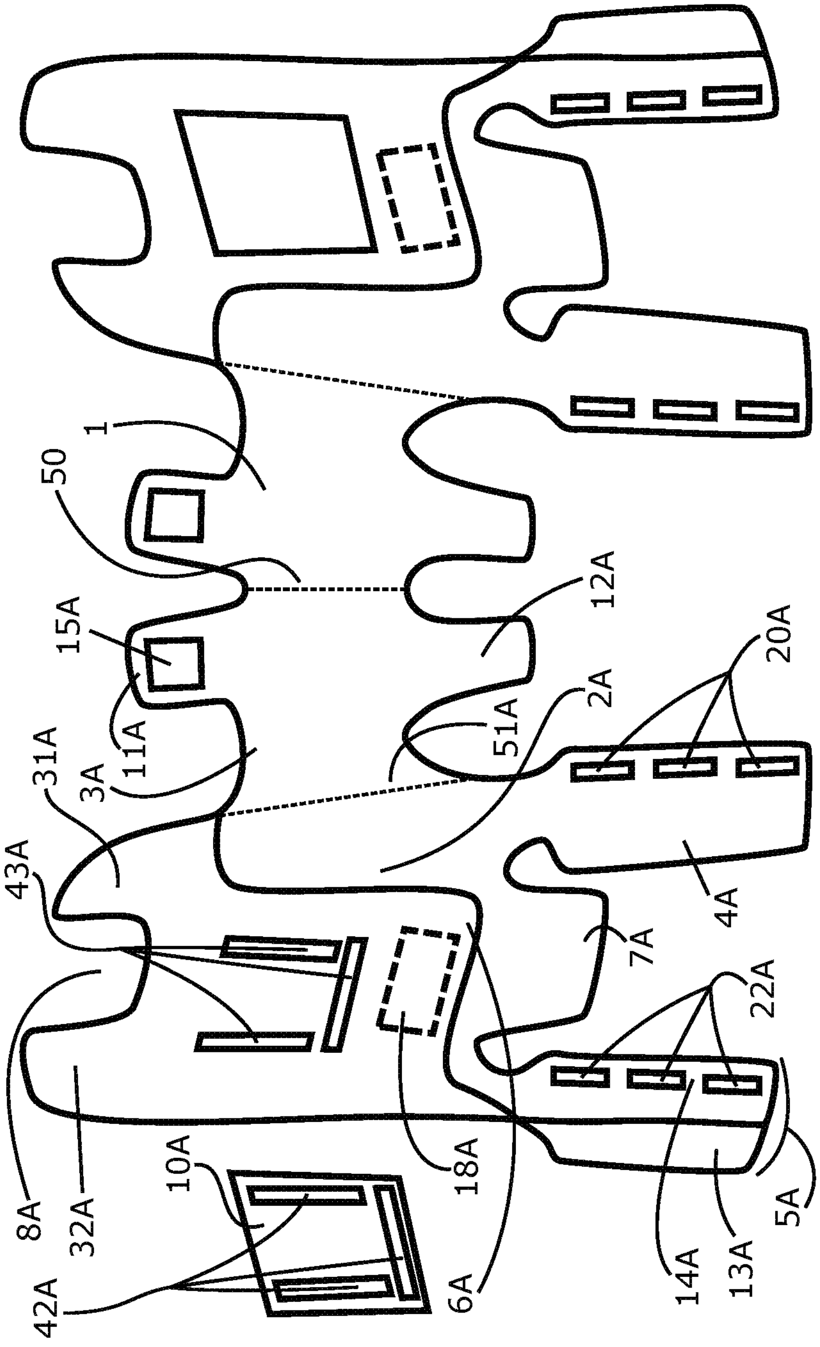
FIGS. 7A and 7B illustrate an embodiment of the walking frame cover with detachable pockets, with each depicting one inner pocket detached from the side frame cover inner flap to reveal the fasteners used to secure it.
Figure 7B:
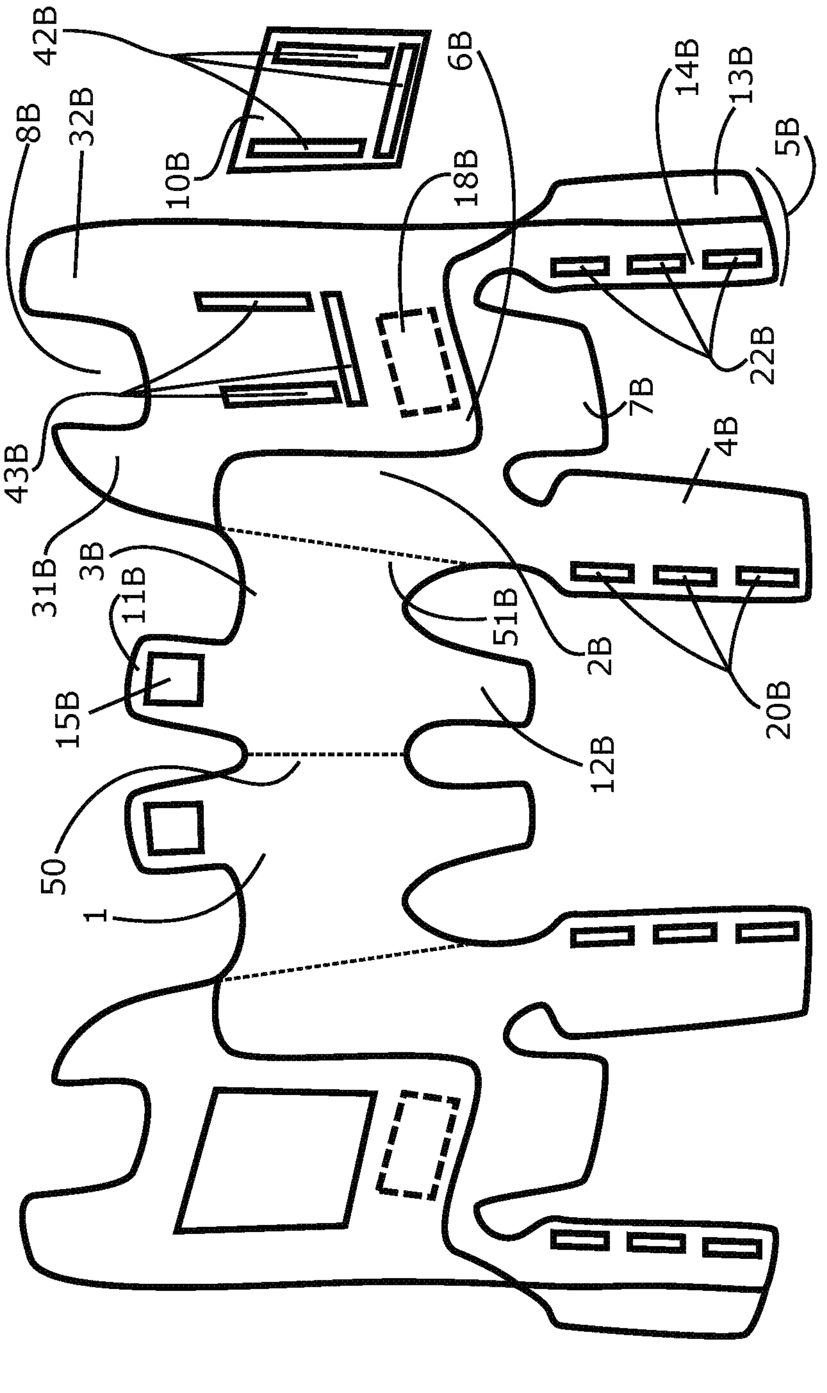

FIGS. 7A and 7B depict the same detachable feature for the inner pockets. In FIG. 7A, inner pocket (IOA) is attached to the side frame cover inner flap (6A) by securing fastener group (42A) to fastener group (43A). To detach inner pocket (IOA) from side frame cover inner flap (6A), fastener group (42A) is unfixed from fastener group (43A). FIG. 7B then depicts the obverse side inner pocket (lOB), which is attached to the side frame cover inner flap (6B) by securing fastener group (42B) to fastener group (43B). To detach inner pocket (lOB) from side frame cover inner flap (6B), fastener group (42B) is unfixed from fastener group (43B).

Where variations of walking frames exist, a corresponding modification is made to the walking frame cover to allow for secure attachment of the cover around the frame. Notably, the walking frame cover is not required to directly attach to the surface of the walking frame to be secured. In further embodiments, the walking frame may utilize adhesive hook-and-loop materials, where the cover then has a hook-and-loop attachment to the walking frame itself. However, the cover is designed to secure around components of the walking frame. This eliminates the frustration of attaching means such as hook-and-loop material, snaps, or buttons, where it is difficult to align the cover to the specific location on the frame, or to remove them when inaccessible, to selectively attach and detach the cover from the frame. Instead, by wrapping around the frame, the cover is selectively secured into place and can be easily removed if desired.

In the broadest application, the walking frame cover comprises at least a planar material cut into a defined shape and having a plurality of matching pair fasteners to secure the cover around a walking frame. The cover comprises at least one receptacle defined by an inner and outer material and wherein the receptacle comprises an opening (aperture) to allow for a handle portion of a walking frame to be accessible through the aperture. The remaining portion of the walking frame cover then utilizes the plurality of fasteners to secure to or around the walking frame. This enables a cover to securely fit over and around a walking frame, thereby defining a cover to the walking frame.

The foregoing exemplary embodiments of the walking frame cover now being described are claimed below. However, those of ordinary skill in the art will understand that modifications to the embodiments may be made without departing from the spirit and scope of the present embodiments.

What is claimed is:

1. A cover for a three-dimensional walking frame, the cover comprising:

a left side section and a right side section which mirror each other, each section comprising a cross frame cover comprising an upper and lower cross frame flap, wherein each cross frame cover is connected on a first end and a side frame cover attached to a second end of the cross frame cover, each of the upper and lower cross frame flap comprising fasteners for securing the upper and lower cross frame flaps together;

wherein each of the side frame covers comprises an outer flap and an inner flap, a top and a bottom, two arms, and a receptacle defined between the outer flap and the inner flap, wherein the outer and inner flaps of each side frame cover are secured together to define an aperture at the top of the receptacle and an opening at the bottom.

2. The cover of claim 1, wherein the aperture provides an opening for a handle of the three-dimensional walking frame.

3. The cover of claim 2, wherein the two arms are configured to rest atop a side frame of the three-dimensional walking frame.

4. The cover of claim 3, wherein the outer flap and the inner flap are secured at the top and at a left side and a right side of each of the outer flap and inner flap, with the aperture defined at the top, and each of the outer flap and inner flap each having an outside surface and an inside surface.

5. The cover of claim 1, further comprising at least one pocket on an outside surface of the side frame cover.

6. The cover of claim 5, wherein the at least one pocket on the outside surface of the side frame cover is selectively attachable and detachable.

7. The cover of claim 1, the side frame cover having a side frame flap configured to be folded up around a side frame lower crossmember of the three-dimensional walking frame and a first fastener on the side frame flap configured to be attached to a second fastener on an inner surface of the inner flap.

8. A cover for a three-dimensional walking frame, the cover comprising:

a left side section and a right side section which mirror each other, each section comprising a cross frame cover connected on a first end and a side frame cover attached to a second end of the cross frame cover;

wherein each of the side frame covers comprises an outer flap, an inner flap, and a side frame flap comprising a first fastener, and a receptacle defined between the outer flap and the inner flap, wherein the outer and inner flaps are secured together to define an aperture, wherein the side frame flap is configured to be folded up around a side frame lower crossmember of the three-dimensional walking frame, and wherein the first fastener is configured to be attached to a second fastener on an inner surface of the inner flap.

9. The cover of claim 8, wherein the aperture provides an opening for a handle of the three-dimensional walking frame.

10. The cover of claim 9, wherein two arms are configured to rest atop a side frame of the three-dimensional walking frame.

11. The cover of claim 10, wherein the outer flap and the inner flap are secured at a top portion of the side frame cover and at a left side and a right side of each of the outer flap and inner flap, with the aperture defined at the top portion of the side frame cover, and each of the outer flap and inner flap each having an outside surface and an inside surface.

12. The cover of claim 8, further comprising at least one pocket on the outside surface of the side frame cover.

13. The cover of claim 12, wherein the at least one pocket on the outside surface of the side frame cover is selectively attachable and detachable.

14. A cover for a three-dimensional walking frame, the cover comprising:

a left side section and a right side section which mirror each other, each section comprising a cross frame cover connected on a first end and a side frame cover attached to a second end of the cross frame cover;

wherein each of the side frame covers comprises an outer flap and an inner flap, two arms, and a receptacle defined between the outer flap and the inner flap, wherein the outer and inner flaps define an aperture at a top portion of the side frame cover and an opening at a bottom portion of the side frame cover.

15. The cover of claim 14, wherein the aperture provides an opening for a handle of the three-dimensional walking frame.

16. The cover of claim 15, wherein the two arms are configured to rest atop a side frame of the three-dimensional walking frame.

17. The cover of claim 16, wherein the outer flap and the inner flap are secured at the top portion and at a left side and a right side of each of the outer flap and inner flap, with the aperture defined at the top portion, and each of the outer flap and inner flap each having an outside surface and an inside surface.

18. The cover of claim 14, further comprising at least one pocket on an outside surface of the side frame cover.

19. The cover of claim 18, wherein the at least one pocket on the outside surface of the side frame cover is selectively attachable and detachable.

* * * * *